(12) United States Patent
Kuroda et al.

(10) Patent No.: US 7,222,364 B2
(45) Date of Patent: May 22, 2007

(54) INFORMATION SENDING METHOD AND INFORMATION SENDING APPARATUS, INFORMATION RECEIVING APPARATUS AND INFORMATION RECEIVING METHOD, INFORMATION TRANSMISSION SYSTEM AND INFORMATION TRANSMISSION METHOD, AND INFORMATION RECORDING MEDIUM

(75) Inventors: Kazuo Kuroda, Tokorozawa (JP); Yoshiaki Moriyama, Tokorozawa (JP); Takashi Hashimoto, Tokyo-to (JP); Akihiko Naito, Tokyo-to (JP)

(73) Assignee: Pioneer Corporation, Tokyo-to (JP)

( * ) Notice: Subject to any disclaimer, the term of this patent is extended or adjusted under 35 U.S.C. 154(b) by 714 days.

(21) Appl. No.: 09/944,179

(22) Filed: Sep. 4, 2001

(65) Prior Publication Data
US 2002/0027991 A1 Mar. 7, 2002

(30) Foreign Application Priority Data
Sep. 4, 2000 (JP) ............................ P2000-267612

(51) Int. Cl.
*G06F 17/30* (2006.01)
(52) U.S. Cl. .................................. 726/6; 726/3; 726/5
(58) Field of Classification Search ................ 713/200, 713/153, 168; 380/210; 726/3, 5, 6
See application file for complete search history.

(56) References Cited

U.S. PATENT DOCUMENTS

| | | | |
|---|---|---|---|
| 5,757,909 A | 5/1998 | Park | |
| 5,848,072 A | 12/1998 | Prill et al. | |
| 5,864,667 A | 1/1999 | Barkan | |
| 6,061,794 A * | 5/2000 | Angelo et al. | ............... 713/200 |
| 6,212,633 B1 * | 4/2001 | Levy et al. | .................. 713/153 |
| 6,697,944 B1 * | 2/2004 | Jones et al. | .................. 713/168 |

FOREIGN PATENT DOCUMENTS

| | | |
|---|---|---|
| CN | 1137723 A | 12/1996 |
| CN | 1156933 A | 8/1997 |
| CN | 11-59108 A | 9/1997 |
| CN | 1167551 A | 12/1997 |
| CN | 12-52912 A | 5/2000 |
| EP | 0 318 097 A1 | 5/1989 |

(Continued)

OTHER PUBLICATIONS

"Integration of 5C with a 1394 Audio/Video Link Chip", 2000, [Retrieved from Internet Mar. 14, 2005], http://www.semiconductors.philips.com/acrobat_download/other/1394/l41wpv2.pdf.*

(Continued)

*Primary Examiner*—David Jung
(74) *Attorney, Agent, or Firm*—Sughrue Mion, PLLC

(57) ABSTRACT

Encrypted music information or the like and encryption processing information itself employed for the encrypting is transmitted from a set top box (BX) to a recorder (R) via a serial bus (B) after decoded, and the music information or the like is recorded in a DVD-R (1). Upon this recording, the music information encoded by employing an asynchronous transmission region in the IEEE 1394 standard that is a standard with which the serial bus (B) conforms is transmitted at a high speed. On the other hand, encode processing information encoded by employing an isochronous transmission region in the IEEE 1394 standard is transmitted at a 1-fold speed.

11 Claims, 4 Drawing Sheets

FOREIGN PATENT DOCUMENTS

| | | |
|---|---|---|
| EP | 1006531 A | 7/2000 |
| WO | WO 9966680 A | 12/1999 |
| WO | WO 0030104 A | 5/2000 |
| WO | WO 00/45241 A2 | 8/2000 |

OTHER PUBLICATIONS

De-synchronization: asynchronous circuits from synchronous specifications Sotiriou, C.P.; Lavagno, L.; SOC Conference, 2003. Proceedings. IEEE International [Systems-on-Chip] Sep. 17-20, 2003 pp. 165-168.*

Suitability of cryptographic modes of operation for the encryption in high-speed networks Jung, O.; Kuhn, S.; Ruland, C.; Wollenweber, K.; Networks, 2001. Proceedings. Ninth IEEE International Conference on Oct. 10-12, 2001 pp. 134-139.*

Asynchronous low power VLSI implementation of the International Data Encryption Algorithm Sklavos, N.; Koufopavlou, O.; Electronics, Circuits and Systems, 2001. ICECS 2001. The 8th IEEE International Conference on vol. 3, Sep. 2-5, 2001 pp. 1425-1428 vol. 3.*

English Abstract of WO 98/48543, abstracting CN 12-52912 published Oct. 15, 2000.

English Abstract of CN 11-59108 published Sep. 10, 1997.

European Office Communication dated Jul. 26, 2006.

* cited by examiner

INFORMATION SENDING METHOD AND INFORMATION SENDING APPARATUS, INFORMATION RECEIVING APPARATUS AND INFORMATION RECEIVING METHOD, INFORMATION TRANSMISSION SYSTEM AND INFORMATION TRANSMISSION METHOD, AND INFORMATION RECORDING MEDIUM

BACKGROUND OF THE INVENTION

1. Field of the Invention

The present invention relates to a technical field of: an information sending apparatus; an information sending method; an information receiving apparatus; an information receiving method; an information transmission system; an information transmission method; and an information recording medium. More particularly, the present invention relates to a technical field of: an information sending apparatus, an information sending method, an information receiving apparatus and an information receiving method capable of sending/receiving encoded information and encode processing information employed for the encoding; an information transmission system including the information sending apparatus or information receiving apparatus; and an information recording medium having a sending control program or a receiving control program recorded therein.

2. Description of the Related Art

Conventionally, music information or the like broadcast by employing broadcasting electric waves is received by means of a broadcast receiving set top box, and the received information is recorded in a recording medium such as optical disc by employing an information recording apparatus.

On the other hand, in recent years, in view of advancement of an image compression technique and a high-density recording technique, one movie or the like is distributed via broadcasting electric waves, and the distributed movie is recorded in an information recording medium with its high recording capacity such as DVD (optical disc with its recording capacity higher than a conventional CD (compact disc) by several times) or the like, for example.

In distribution of music information or the like as described above, there is a problem as to how copyrights in the music information or the like are protected. In this respect, conventionally, encoding has been carried out in both over a transmission channel from the set top box to the information recording apparatus and during recording into an information recording medium, and then distribution or recording has been carried out.

In recent years, music information or the like is often transmitted in a transmission mode in conformity to IEEE 1394 Standard (official name is "IEEE std. 1394-1995 IEEE Standard for a High Performance Serial Bus".) between the set top box and the information recording apparatus. In this case, copyright protection has been often carried out between the set top box and the information recording apparatus based on DTCP (Digital Transmission Copy Protection) Standard that is a standard for copyright protection.

In the above DTCP Standard, the music information or the like encoded by employing predetermined encode processing information for encoding is transmitted from the set top box to the information recording apparatus. Further, the encode processing information itself is encoded, and is transmitted from the set top box to the information recording apparatus. The information recording apparatus is arranged to decode the encoded music information by employing encode processing information transmitted.

Conventionally, the encoded music information or the like has been transmitted in accordance with the DTCP Standard by employing the isochronous transmission mode in the IEEE 1394 Standard.

The contents of the above DTCP Standard are disclosed in detail by way of the DTLA ((Digital Transmission Licensing Administrator) over the Internet (URL - - - http://www.dtcp.com).

In the above conventional arrangement, the encoded music information or the like has been transmitted in accordance with the DTCP Standard employing an asynchronous transmission mode in the IEEE 1394 Standard. However, in the current DTLA, a transmission speed in information transmission in accordance with the DTCP Standard is merely allowed to use a speed identical to a reproduction speed of music information or the like after recorded. Thus, there has been a problem that music information or the like encoded by making best use of the characteristics of the IEEE 1394 Standard cannot be transmitted from the set top box to the information recording apparatus at a high speed.

In addition, in the above conventional arrangement, copyrights have been protected during transmission in accordance with the DTCP Standard. However, before encoding based on the DTCP Standard in the set top box and after decoding in an information recording apparatus, there is a possibility that music information or the like is not encoded. Thus, there has been a problem that copyright information is protected insufficiently at each stage.

SUMMARY OF THE INVENTION

The present invention has been made in order to solve the foregoing problem. It is an object of the present invention to provide an information sending apparatus and an information sending method, an information receiving apparatus and an information receiving method, an information transmission system and an information transmission method including the information sending apparatus and information receiving apparatus, and an information recording medium having a sending control program or a receiving control program recorded therein, capable of, in the case of transmitting music information or the like encoded by employing encode processing information, transmitting the music information or the like at a high speed and in large amount with security being improved by encoding the music information or the like.

The above object of the present invention can be achieved by an information transmitting system of the present invention in which a plurality of information processing apparatuses are interconnected with each other via a transmitting device capable of transmitting information in accordance with a first transmission mode for transmitting information so as to be synchronous to other information or a second transmission mode for transmitting information so as to be asynchronous to other information, said second transmission mode for transmitting said information at a higher speed than that of transmission in accordance with said first transmission mode. Said each information processing apparatus is provided with: a first exchange device for mutually exchanging encryption processing information, being employed for encrypting said information, between the information processing apparatuses via said transmitting device in said first transmission mode; and a second exchange device for mutually exchanging encrypted information between said information processing apparatuses via said transmitting device in said second transmission mode.

According to the present invention, encrypted specific information is sent/received in accordance with a second transmission mode at a high speed, and encryption processing information is sent/received in a first transmission mode. Thus, specific information to be sent/received between information processing units can be sent and received at a high speed and in large amount while the specific information is encrypted. In addition, specific information is encrypted prior to be sent, and thus, the specific information can be sent while the security of the specific information is improved.

The above object of the present invention can be achieved by an information transmitting method of the present invention in a information transmission system in which a plurality of information processing apparatuses are interconnected with each other via a transmitting device capable of transmitting information in accordance with a first transmission mode for transmitting information so as to be synchronous to other information or a second transmission mode for transmitting information so as to be asynchronous to other information, said second transmission mode for transmitting said information at a higher speed than that of transmission in accordance with said first transmission mode. The method is provided with the processes of: mutually exchanging encryption processing information, being employed for encrypting said information, between the information processing apparatuses via said transmitting device in said first transmission mode; and mutually exchanging encrypted information between said information processing apparatuses via said transmitting device in said second transmission mode.

According to the present invention, encrypted specific information is sent/received in accordance with a second transmission mode at a high speed, and encryption processing information is sent/received in a first transmission mode. Thus, specific information to be sent/received between information processing units can be sent and received at a high speed and in large amount while the specific information is encrypted. In addition, specific information is encrypted prior to be sent, and thus, the specific information can be sent while the security of the specific information is improved.

The above object of the present invention can be achieved by an information sending apparatus of the present invention for sending information to an information receiving apparatus via a transmitting device capable of transmitting said information in accordance with a first transmission mode for transmitting information so as to be synchronous to other information or a second transmission mode for transmitting information so as to be asynchronous to other information, said second transmission mode for transmitting said information at a higher speed than that of transmission in accordance with said first transmission mode. The information sending apparatus is provided with: a first encrypting device for employing encryption processing information for encrypting said information, thereby encrypting specific information to be sent to said information receiving apparatus; a first sending device for sending said encrypted specific information to said information receiving apparatus via said transmitting device in accordance with said second transmission mode; a second encrypting device for encrypting said encryption processing information itself; and a second sending device for sending said encrypted encryption processing information to said information receiving apparatus via said transmitting device in accordance with said first transmission mode.

According to the present invention, encrypted specific information is sent/received in accordance with a second transmission mode at a high speed, and encryption processing information is sent/received in a first transmission mode. Thus, specific information to be sent/received between information processing units can be sent and received at a high speed and in large amount while the specific information is encrypted. In addition, specific information is encrypted prior to be sent, and thus, the specific information can be sent while the security of the specific information is improved.

In one aspect of the present invention, said specific information is AV (Audio/Visual) information, and said encryption processing information is an encryption key and an encryption table for encrypting the AV information.

According to this aspect of the present invention, required AV information can be sent at a high speed and in large amount while the security is improved.

In another aspect of the present invention, said transmitting device transmits said encrypted specific information and said encrypted encryption processing information in conformity to IEEE (Institute of Electrical and Electronic Engineers) 1394 Standard, and said first transmission mode is an isochronous transmission mode in the IEEE 1394 Standard and said second transmission mode is an asynchronous transmission mode in the IEEE 1394 Standard.

According to this aspect of the present invention, encrypted specific information is sent in an asynchronous transmission mode, and thus, the specific information can be sent to an information receiving apparatus at a maximum transmission seed in the IEEE 1394 Standard.

The above object of the present invention can be achieved by an information sending method of the present invention of sending information to an information receiving apparatus via a transmitting device capable of transmitting said information in accordance with a first transmission mode for transmitting information so as to be synchronous to other information or a second transmission mode for transmitting information so as to be asynchronous to other information, said second transmission mode for transmitting said information at a higher speed than that of transmission in accordance with said first transmission mode. The information sending method is provided with the processes of: employing encryption processing information for encrypting said information, thereby encrypting specific information to be sent to said information receiving apparatus; sending said encrypted specific information to said information receiving apparatus via said transmitting device in accordance with said second transmission mode; encrypting said encryption processing information itself; and sending said encrypted encryption processing information to said information receiving apparatus via said transmitting device in accordance with said first transmission mode.

According to the present invention, encrypted specific information is sent in a second transmission mode at a high speed, and thus, encryption processing information is transmitted in a first transmission mode. Thus, specific information to be sent to an information receiving apparatus can be sent at a high speed and in large amount while the specific information is encrypted. In addition, the specific information is encrypted prior to be sent, and the specific information can be sent while the security of the specific information is improved.

The above object of the present invention can be achieved by an information receiving apparatus of the present invention for receiving said encrypted specific information sent from said information sending apparatus. The information receiving apparatus is provided with: a first acquisition device for acquiring said encrypted specific information from said transmitting device; a second acquisition device for acquiring said encrypted encryption processing information from said transmitting device; a first decrypting device for decrypting said encrypted encryption processing information; and a second decrypting device for decrypting said encrypted specific information employing said decrypted encryption processing information.

According to the present invention, encrypted specific information is decrypted by employing encryption processing information obtained by decrypting encryption processing information acquired from a transmitting device, and thus, specific information can be received at a high speed and in large amount. In addition, the specific information can be received while the security of the specific information is improved.

In one aspect of the present invention, the apparatus is further provided with a recording device for recording said decrypted specific information in a recording medium.

According to this aspect of the present invention, specific information with its high security is acquired at a high speed, and the specific information can be recorded in a recording medium.

The above object of the present invention can be achieved by an information receiving method of the present invention in the information receiving apparatus for receiving said encrypted specific information sent from said information sending apparatus. The information receiving method is provided with the processes of: acquiring said encrypted specific information from said transmitting device; acquiring said encrypted encryption processing information from said transmitting device; decrypting said encrypted encryption processing information; and decrypting said encrypted specific information employing said decrypted encryption processing information.

According to the present invention, encrypted specific information is decrypted by employing encryption processing information obtained by decrypting encryption processing information acquired from a transmitting device. Thus, the specific information can be received at a high speed and in large amount, and the specific information can be received while the security of the specific information is improved.

The above object of the present invention can be achieved by an information transmitting system of the present invention. The system is provided with: a transmitting device capable of transmitting information in accordance with a first transmission mode for transmitting information so as to be synchronous to other information or a second transmission mode for transmitting so as to be asynchronous to other information, said transmitting mode for transmitting said information at a higher speed than that of transmission in accordance with said first transmission mode; an information sending apparatus for sending said information via the transmitting device; and an information receiving apparatus for receiving said sent information via said transmitting device. Further, (i) said information sending apparatus is provided with: a first encrypting device for employing encryption processing information for encrypting said information, thereby encrypting specific information to be sent to said information receiving apparatus; a first sending device for sending said encrypted specific information to said information receiving apparatus via said transmitting device in accordance with said second transmission mode; a second encrypting device for encrypting said encryption processing information itself; and a second sending device for sending said encrypted encryption processing information to said information receiving apparatus via said transmitting device in accordance with said first transmission mode, (ii) said information receiving apparatus is provided with: a first acquisition device for acquiring said encrypted specific information from said transmitting device; a second acquisition device for acquiring said encrypted encryption processing information from said transmitting device; a first decrypting device for decrypting said encrypted encryption processing information; and a second decrypting device for decrypting said encrypted specific information by employing said decrypted encryption processing information.

According to the present invention, encrypted specific information is sent and received in a second transmission mode at a high speed, and encryption processing information is sent and received in a first transmission mode. Thus, the specific information to be transmitted to an information receiving apparatus can be sent and received at a high speed and in large amount while the specific information is encrypted. In addition, the specific information is encrypted prior to be sent, and the specific information is decrypted after received, and is employed for decrypting encrypted specific information. Thus, the specific information can be sent and received while the security of the specific information is improved.

The above object of the present invention can be achieved by an information recording medium of the present invention having a sending control program recorded to be readable by a sending computer in an information sending apparatus for sending information to an information receiving apparatus via a transmitting device capable of transmitting said information in accordance with a first transmission mode for transmitting information so as to be synchronous to other information or a second transmission mode for transmitting information so as to be asynchronous to other information, the second transmission mode for transmitting said information at a higher speed than that of transmission in accordance with said first transmission mode. The sending control program causes said sending computer to function as: a first encrypting device for employing encryption processing information for encrypting said information, thereby encrypting specific information to be transmitted to said information receiving apparatus; a first sending device for sending said encrypted specific information to said information receiving apparatus via said transmitting device in accordance with said second transmission mode; a second encrypting device for encrypting said encryption processing information itself; and a second sending device for sending said encrypted encryption processing information to said information receiving apparatus via said transmitting device in accordance with said first transmission mode.

According to the present invention, encrypted specific information is sent in a second transmission mode, and a sending computer is functioned so as to send encryption processing information in a first transmission mode. Thus, specific information to be sent to an information receiving apparatus can be sent at a high speed and in large amount while the specific information is encrypted. In addition, the sending computer is functioned so that the specific information is encrypted prior to be sent. Thus, the specific information can be sent to an information receiving apparatus while the security of the specific information is improved.

The above object of the present invention can be achieved by an information recording medium of the present invention having a receiving control program recorded to be readable by a receiving computer in an information receiving apparatus for receiving encrypted information transmitted from an information sending apparatus for sending information to said information receiving apparatus via a transmitting device capable of transmitting said information in accordance with a first transmission mode for transmitting information so as to be synchronous to other information or a second transmission mode for transmitting information so as to be asynchronous to other information, the second transmission mode for transmitting said information at a higher speed than that of transmission in accordance with said first transmission mode. The receiving control program causes said receiving computer to function as: a first acquisition device for acquiring encrypted specific information from said information sending apparatus; a second acquisition device for acquiring said encrypted encryption processing information from said information sending apparatus; a first decrypting device for decrypting said encrypted encryption processing information; and a second decrypting device for decrypting said encrypted specific information employing said decrypted encryption processing information.

According to the present invention, a receiving computer is functioned so as to decrypt encrypted specific information by employing encryption processing information obtained by decrypting encryption processing information acquired from a transmitting device. Thus the specific information can be received at a high speed and in large amount, and the specific information can be received while the security of the specific information is improved.

The above object of the present invention can be achieved by a computer data signal of the present invention embodied in a carrier wave and representing a sequence of instructions executed by a computer in an information sending apparatus for sending information to an information receiving apparatus via a transmitting device capable of transmitting said information in accordance with a first transmission mode for transmitting information so as to be synchronous to other information or a second transmission mode for transmitting information so as to be asynchronous to other information, the second transmission mode for transmitting said information at a higher speed than that of transmission in accordance with said first transmission mode. The sequence of instructions are provided with the steps of: employing encryption processing information for encrypting said information, thereby encrypting specific information to be transmitted to said information receiving apparatus; sending said encrypted specific information to said information receiving apparatus via said transmitting device in accordance with said second transmission mode; encrypting said encryption processing information itself; and sending said encrypted encryption processing information to said information receiving apparatus via said transmitting device in accordance with said first transmission mode.

According to the present invention, encrypted specific information is sent in a second transmission mode, and a sending computer is functioned so as to send encryption processing information in a first transmission mode. Thus, specific information to be sent to an information receiving apparatus can be sent at a high speed and in large amount while the specific information is encrypted. In addition, the sending computer is functioned so that the specific information is encrypted prior to be sent. Thus, the specific information can be sent to an information receiving apparatus while the security of the specific information is improved.

The above object of the present invention can be achieved by a computer data signal of the present invention embodied in a carrier wave and representing a sequence of instructions executed by a computer in an information receiving apparatus for receiving encrypted information transmitted from an information sending apparatus for sending information to said information receiving apparatus via a transmitting device capable of transmitting said information in accordance with a first transmission mode for transmitting information so as to be synchronous to other information or a second transmission mode for transmitting information so as to be asynchronous to other information, the second transmission mode for transmitting said information at a higher speed than that of transmission in accordance with said first transmission mode. The sequence of instructions are provided with comprising the steps of: acquiring encrypted specific information from said transmitting device; acquiring said encrypted encryption processing information from said transmitting device; decrypting said encrypted encryption processing information; and decrypting said encrypted specific information employing said decrypted encryption processing information.

According to the present invention, a receiving computer is functioned so as to decrypt encrypted specific information by employing encryption processing information obtained by decrypting encryption processing information acquired from a transmitting device. Thus the specific information can be received at a high speed and in large amount, and the specific information can be received while the security of the specific information is improved.

BRIEF DESCRIPTION OF THE DRAWINGS

FIG. 1A is a view showing an example of a serially connected electric device, and FIG. 1B is a view showing a loop connection;

DESCRIPTION OF THE PREFERRED EMBODIMENTS

Figure 1A:
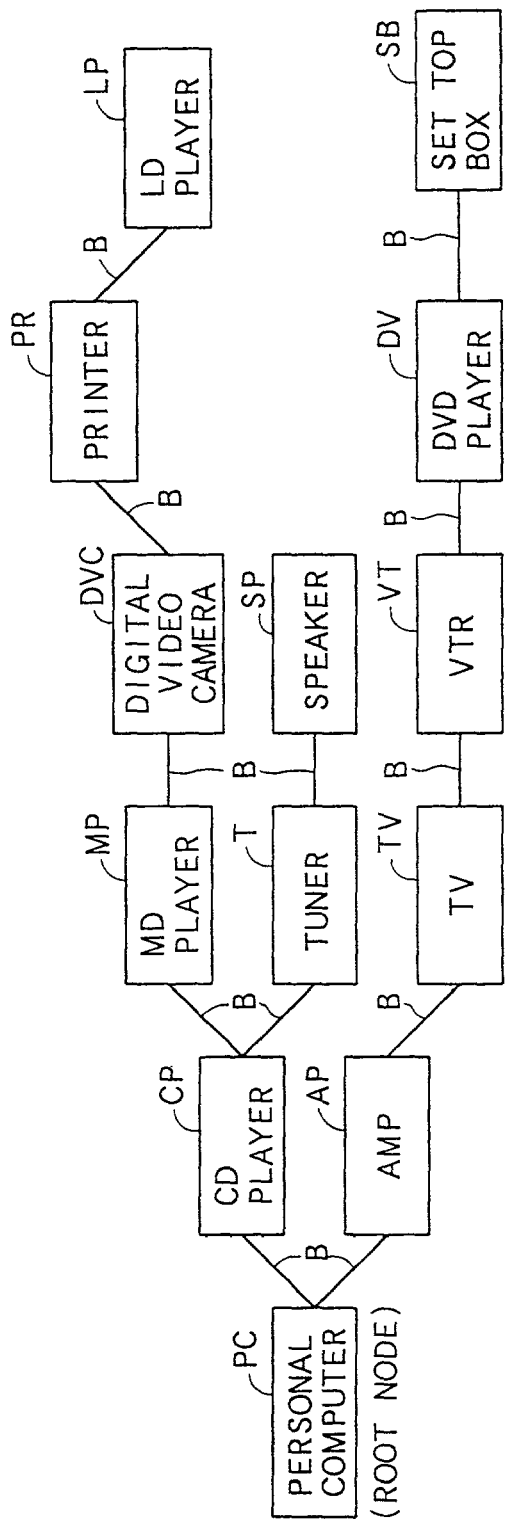
FIG. 1A and FIG. 1B are diagrams each showing an example of an electric product (node) connected in accordance with the IEEE 1394 Standard, where

Hereinafter, preferred embodiments of the present invention will be described with reference to the accompanying drawings.

The preferred embodiments describes a case in which the present invention is applied to an information transmission system capable of receiving record information such as music information distributed via broadcasting electric waves by means of a set top box, transmitting the information via a serial bus in conformity with the IEEE 1394 Standard, and further, recording the information in a DVD-R (DVD-Recordable) that is an optical disk capable of recording in the recorder.

(I) IEEE 1394 Standard

First, prior to a description of specific embodiments, an outline of the above IEEE 1394 Standard, on the basis of which record information according to the embodiments is transmitted, will be described.

In general, in the IEEE 1394 Standard, a connection is made between a plurality of information processing units (hereinafter, simply referred to as nodes) via a serial bus, and information transmission by a plurality of channels is standardized so as to be executed in a time division manner. In the standard, within a system connected via a serial bus, information transmission is standardized to be carried out by employing a maximum of 63 different channels.

In the IEEE 1394 Standard (hereinafter, simply referred to as a serial bus standard), in the case where another node is newly connected to nodes already interconnected via a serial bus (i.e., in the case where bus connection is performed) or in the case where one node is disconnected from the above node (i.e., in the case where bus release is performed), serial bus initialization (bus reset) is standardized to be executed. Then, the following processing is executed with the bus resetting, and a new serial bus connection mode (hereinafter, referred to as topology) is constructed.

(1) Based on the occurrence of a bus reset, a node detecting the occurrence (i.e., a node to which another node is newly connected or from which another node is disconnected) delivers a bus reset signal to all nodes connected to the serial bus.

(2) Next, after bus resetting, tree identification for connecting each node onto a tree is carried out. Then, a node positioned at an apex of the connected tree is recognized as a root node.

(3) Then, a recognized root node causes each node to recognize an identification number (ID number) specific to each node for identifying each node in the tree system.

(4) Then, communication states of all nodes that exist in the formed tree (specifically, an used channel of each node and a transmission occupying time described later) is managed, and an IRN (Isochronous Resource Manager) node is set. The IRN node is a node for displaying the transmission occupying time and current used channel of each channel so that another node can identify them.

(5) Finally, a bus manager node is set. The bus manager node is a node for executing centralized control of information transmission states of all nodes.

A new topology after bus resetting is configured through processing at the above five stages.

In the case where information is actually transmitted after topology configuration, a transmission node, which is a node for starting transmission of the information, refers to the IRM node for communication states of the current other nodes. If a desired channel and transmission occupying time are available, the transmission node acquires a right to transmit information. More specifically, the transmission node acquires a channel that the transmission node uses and a transmission occupying time described later. Then, the transmission node starts transmitting information. At this time, immediately before transmitting information, the transmission node transmits the information about the fact that a display of the communication state in the above IRM node is to be written to the IRM node. If the transmission node starts transmitting information, the used channel and transmission occupying time on the serial bus are changed. Therefore, it is necessary to rewrite the display contents into new ones corresponding to a new communication state after changed. The IRM node having received the information about the fact executes processing for updating the display contents. Thereafter, the display contents after the update can be referred to, respectively, from another node.

Now, the transmission occupying time will be briefly described here.

In the IEEE 1394 Standard, the information from each node is sent after integrated in units called isochronous cycles. A "cycle" used here is one time-shared cycle on the serial bus. The isochronous cycle includes an isochronous transmission area including information transmitted in synchronism with information contained in another isochronous cycle (specifically, video information, audio information or the like), and an asynchronous transmission area including information transmitted independent of other information, that is, in asynchronous mode (specifically, control information for controlling output or the like of the video information or audio information). In addition, the information contained in the isochronous transmission area is divided by time sharing for each different channel, and different information for each different channel is transmitted. A case of transmitting information by employing the isochronous transmission area is referred to as an isochronous transmission mode. On the other hand, a case of transmitting information by employing the asynchronous transmission area is referred to as an asynchronous transmission mode.

At this time, in the isosynchrnous transmission region, the time length of an isochronous transmission area in one isosynchrnous cycle is standardized to be 100 microseconds at maximum. Therefore, it is necessary that the total time allotted for each channel for information transmission in one isochronous transmission area should be less than 100 microseconds. A transmission time occupied by such one channel in an isochrnous cycle corresponds to the above transmission occupying time.

The transmission occupying time may sometimes be called the usable bandwidth of the serial bus, and may be called the usable capacity of the serial bus. On the other hand, in one isochronous cycle, when the length of an isochronous transmission a rear is less than 100 microseconds (including when it is zero), the time in an isochronou cycle other than that of the isochronous transmission area is mainly employed as an asynchronous transmission area.

Now, the above serial bus standard will be described more specifically with reference to FIG. 1 to FIG. 3.

Figure 1B:
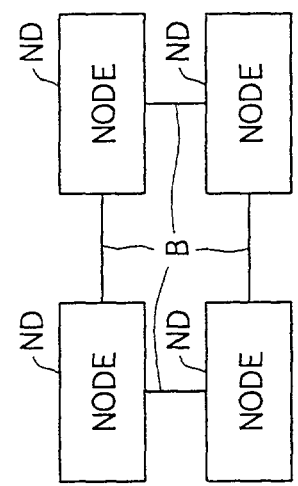

FIGS. 1A and 1B are diagrams illustrating one mode of topology in the serial bus standard. FIG. 2 is a view illustrating a transmission mode over a serial bus. FIG. 3 is a diagram showing a configuration of an isochronous cycle.

The above serial bus standard is a standard for serially connecting all the information processing units, including a variety of current and future electric products, with a serial bus, and mutually exchanging information among those devices.

More specifically, all the settings during node connection are automatically performed, making it possible to further connect a new node without turning the power OFF.

On the other hand, with respect to an information transmission mode, high speed transmission can be carried out in the range of 100 Mbps (bit per seconds) to 400 Mbps. Further, a variety of information can be transmitted in a bi-directional manner through read time transmission, bi-directional transmission, and multi-channel transmission.

In addition, with respect to node connection mode, as shown by the information system J in FIG. 1A, for example, by defining a personal computer PC as a root node (a node at an apex in tree-shaped topology as described above), a variety of electric products such as a CD player CP, an MD (Mini Disc) player MP, a digital video camera DVC, a printer PR, an LD (Laser Disc) playe LP, a tuner T, a speaker SP, an amplifier AP, a television device TV, a digital video tape recorder VT, a DVD player DV, and a set top box SB for broadcasting electric wave reception are connected respectively via a serial bus B, and these elements can be controlled integrally by means of the personal computer PC.

In the serial bus standard, the maximum number of information processing units (corresponding to the above nodes) can be contained in one system (a system connected to the serial bus B in a tree manner) is 63, and further, the maximum number of connections between two nodes in one system is 16. Connecting a plurality of nodes ND in a loop-shaped system as shown in FIG. 1B is prohibited by the serial bus standard.

Now, an actual transmission mode will be described by specifically exemplifying the mode.

Figure 2A:
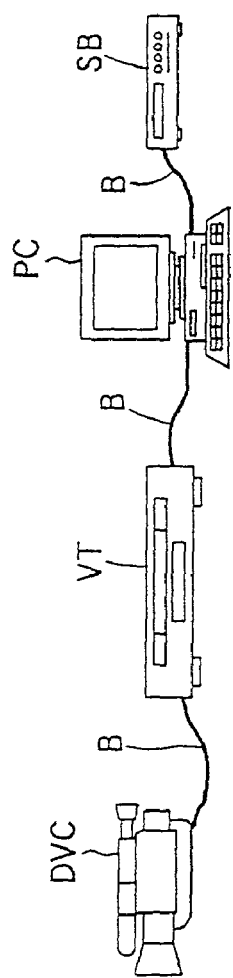
FIGS. 2(A) and 2(B) are views illustrating a transmission mode over a serial bus.

First, as shown in FIG. 2A, a digital video camera DVC, a digital video tape recorder VT, a personal computer PC, and a set top box SB that are connected together as nodes by a serial bus B, respectively, and information transmission is carried out. More specifically, video data is delivered from the digital video camera DVC; a predetermined control command is delivered from the digital video tape recorder VT; a control command for controlling other devices is delivered from the personal computer PC; and video data contained in broadcasting electric waves received from the set top box SB (for example, MPEG (Moving Picture Expert Group) standard is delivered over the serial bus B, respectively.

Figure 2B:
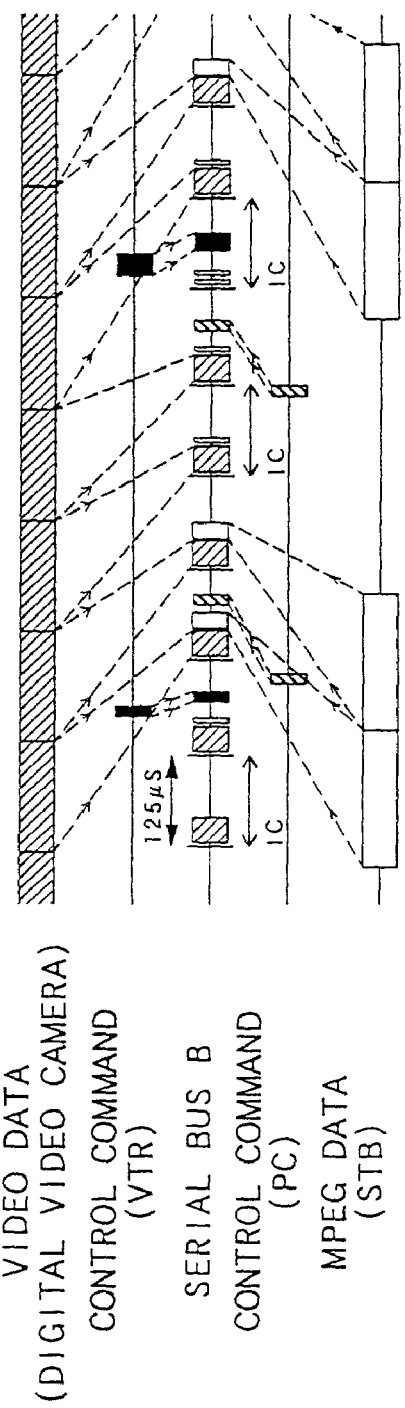

In this case, as shown in FIG. 2B, in a transmission mode for each item of information delivered over the serial bus B, information from each node is transmitted while the information is occupied in a time sharing manner over the serial bus B. Each item of information is inserted into the isochronous cycle IC that is a synchronous unit, having a length of 125 microseconds, and transmitted over the serial bus B.

Now, a data structure in the above isochrinous cycle IC will be described with reference to FIG. 3.

Figure 3:
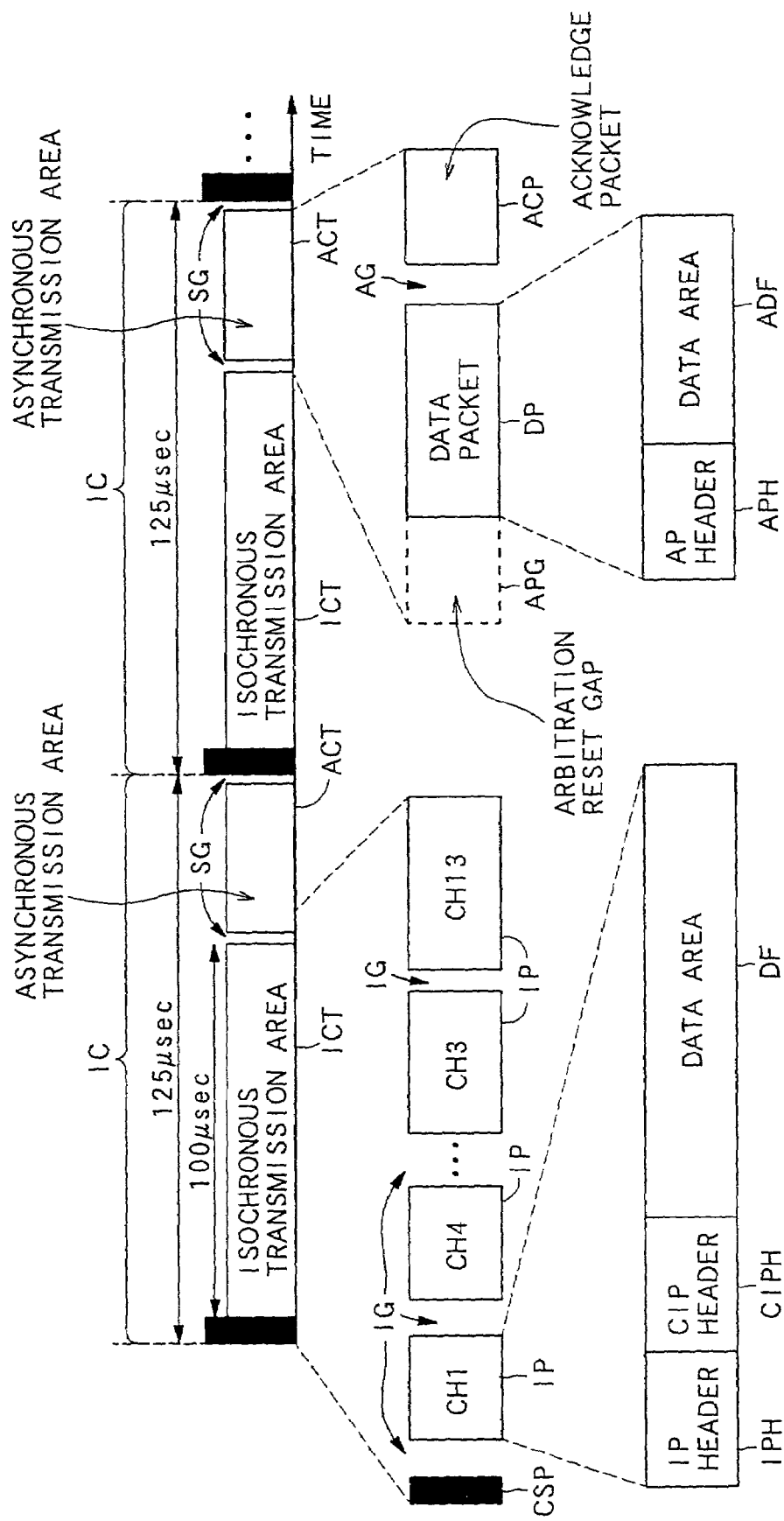
FIG. 3 is a diagram showing an arrangement of an isochronous cycle.

First, as shown in FIG. 3, an isochronous cycle IC is comprised of: a cycle start packet CSP always inserted into the beginning of the isochronous cycle IC in order to adjust a reference time of all the nodes; an isochronous transmission area ICT comprised of a plurality of isochronous packets IP equal to the number of channels in which time synchronized information in contained; and an asynchronous transmission area ACT in which asynchronous information (for example, various control information, response information corresponding to such each control information and the like) is contained.

In addition, a sub-action gap SG that is a time interval indicating the end of one isochronous transmission area ICT or the end of one asynchronous transmission area ACT is inserted into each of the end of the isochronous transmission area ICT and the end of the asynchronous transmission area ACT. Further, an isochronous gap IG that is a time interval indicating the end of each packet is inserted between the isochronous packets IP and between a cycle start packet CSP and the starting isochronous packet IP. The length of the above sub-action gap SG is set to be longer than the isochronous gap IG.

One isochronous packet IP is comprised of: an IP (Isochronous Packet) header IPH containing information indicating the amount of data in each isochronous packet IP, information indicating a channel for transmitting the information in each isochronous packet IP and the like; a CIP header CIPH; and a data area DF containing actual video information or audio information.

On the other hand, the asynchronous transmission area ACT is comprised of: an arbitration reset gap APG that is a time interval for each node to indicate its intention to have transmitted information; a data packet DP containing data such as control information transmitted asynchronously; and an acknowledge packet ACP containing data employed for a response from a node that is a transmission destination. An asynchronous gap A that is a time interval indicating the end of one data packet D is inserted between the data packet D and the acknowledge packet ACP.

One data packet DP is comprised of: an AP (Asynchronous Packet) header APH containing information indicating the destination of each data packet DP; and a data area ADF containing information indicating a transmission occupying time that a data packet DP occupies an asynchronous transmission area ACT and information indicating a occupying channel or actual control information and the like.

According to the above described serial bus standard, control information is transmitted from an information processing unit such as personal computer at a high seed, thereby making it possible to integrally control household appliances or audio-visual equipments such as a DVD player, and making it possible to mutually transmit video information, audio information or the like speedily and precisely between nodes.

(II) Embodiments

Now, an information transmission system according to the embodiments in which record information containing music information and the like is transmitted in accordance with the above described serial bus standard will be described with reference to FIG. 4.

Figure 4:
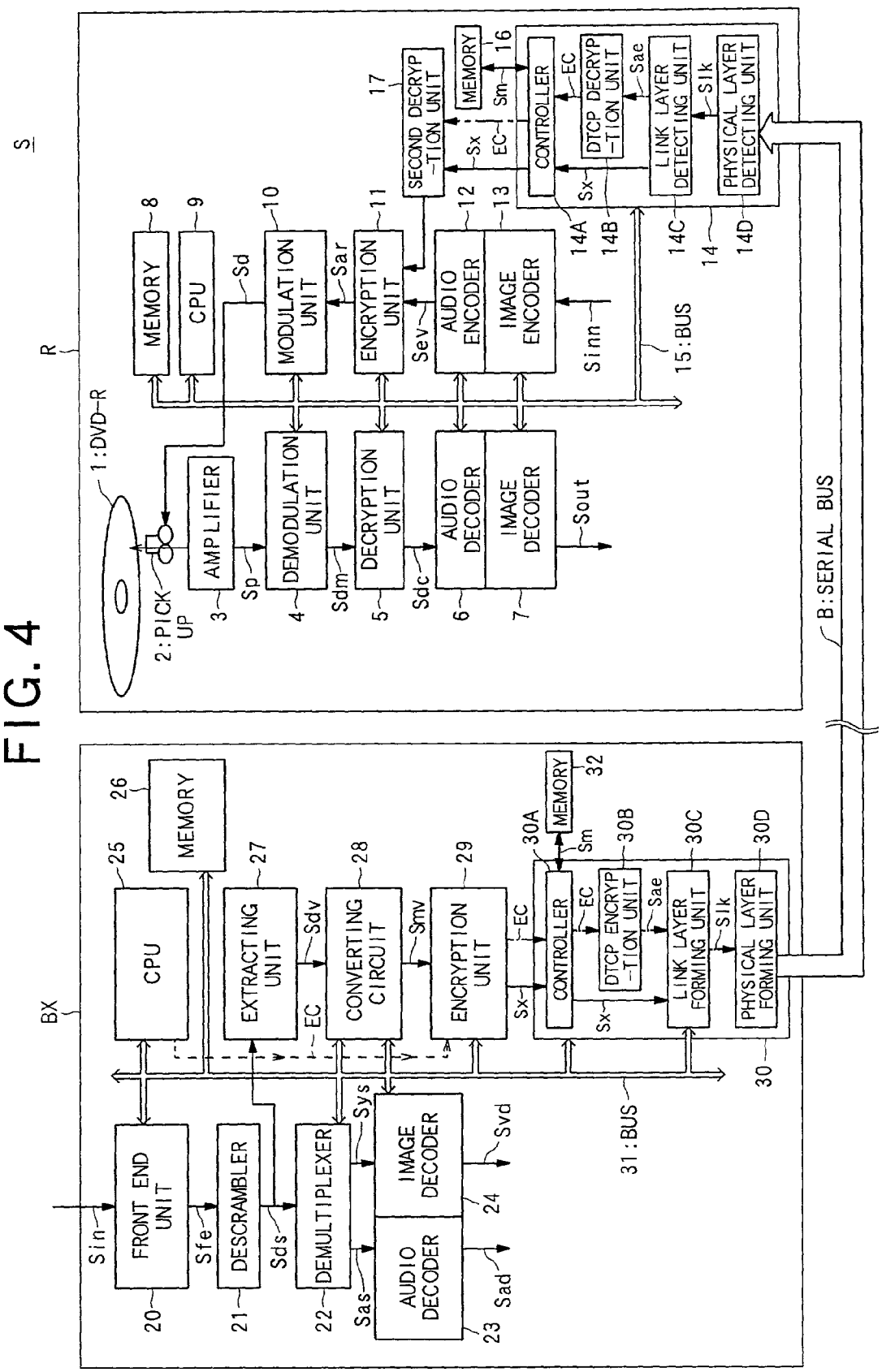
FIG. 4 is a block diagram depicting a schematic configuration of an information transmission system according to an embodiment of the present invention.

As shown in FIG. 4, an information transmission system S according to the embodiments is composed of: a set top box SB that serves as an information sending apparatus for receiving record information Sin transmitted via an external broadcasting electric waves, and outputting the information to a recorder R after applying processing described later to it; and the recorder R that serves as an information receiving apparatus for recording the outputted record information Sin in a DVD-R 1. The recorder R is connected to the set top box SB via a serial bus B as a transmitting device that conforms to the IEEE 1394 standard.

In addition, the set top box SB is comprised of: a front end unit 20; a descrambler 21; a demultiplexer 22; an audio decoder 23; an image decoder 24; a CPU 25; a memory 26; an extracting unit 27; a converting circuit 28; an encryption unit 29 serving as a first encryption device; and an interface unit 30 serving as a first exchange device, a second exchange device, a first sending device and a second sending device. Each component can mutually exchange control information via a bus 31.

Further, the interface unit 30 is comprised of: a controller 30A; a DTCP encryption unit 30B serving as a second encryption device; a link layer forming unit 30C; a physical layer forming unit 30D; and an associated memory 32.

On the other hand, the recorder R is comprised of: a pickup 2; an amplifier 3; a demodulation unit 4; a decryption unit 5; an audio decoder 6; an image decoder 7; a memory 8; a CPU 9 serving as a recording device; a modulation unit 10; an encryption unit 11; an audio encoder 12; an image encoder 13; an interface unit 14 serving as a first exchange device, a second exchange device, a first acquisition device and a second acquisition device; a memory 16; and a second decryption unit 17 serving as a second decrypting device.

Each component excluding the memory 16 and the second decryption unit 17 can mutually exchange control information or the like via a bus 15.

In addition, the interface unit 14 is comprised of: a controller 14A; a DTCP decryption unit 14B serving as a first decryption device; a link layer detecting unit 14C; and a physical layer detecting unit 14D.

Now, an operation of the set top box BX and the recorder R will be described.

(i) General Operation

First, a general operation will be described.

The set top box BX according to the embodiments can transmit record information to the recorder as described above and output received music information, etc. to a television device (not shown) or the like.

In addition, the recorder R according to the embodiments can record not only the record information transmitted from the set top box BX but also record information Sinn outputted from a device other than the set top box BX into the DVD-R 1. In addition, the recorder R can reproduce music information or the like recorded in the DVD-R 1 and output it to an external device as an output signal Sout.

First, a description will be given with respect to an operation when externally inputted record information Sin is outputted to the above television device (not shown) in the set top box BX.

In this case, the record information Sin contains image information together with the above music information, and these items of information are compressed and encrypted to be inputted into the set top box BX, respectively.

The front end unit 20 applies predetermined receive processing to the record information Sin, and generates a reception signal Sfe to output the signal to the descrambler 21.

Next, the descrambler 21 decrypts encrypted audio information and image information contained in the reception signal Sfe, and generates a decryption signal Sds to output the signal to the demultiplexer 22.

The demultiplexer 22 separates audio information and image information contained in the decryption signal Sds, and outputs the separated audio information as an audio signal Sas to the audio decoder 23. In addition, the separated image information is outputted as an image signal Svs to the image decoder 24.

Then, the audio decoder 23 decodes the audio signal Sas, and outputs an audio output signal Sad to a television device (not shown).

On the other hand, the image decoder 24 decodes the image signal Svs, and outputs a video output signal Svd to the television device (not shown) in the same manner.

At this time, the CPU 25 integrally controls the above components while exchanging required control information via the bus 31. In addition, the information required for integral control is temporarily stored in the memory 26 via the bus 31, and employed for the integral control.

Now, an operation for recording externally inputted record information Sinn into the DVD-R 1 in the recorder R will be described.

In this case as well, the record information Sinn contains image information together with music information, and is inputted into the recorder R.

The image encoder 13 applies predetermined modulate processing and encryption processing to image information in the record information Sinn, and generates recording image information.

In addition, the image encoder 12 applies modulate processing and encryption processing corresponding to modulate processing of the above image information to audio information contained in the record information Sinn, and generates recording audio information.

Next, the encryption unit 11 applies predetermined encryption processing for recording in the DVD-R 1 to a record signal Sev that contains the above recording image information and recording audio information and generates an encryption record signal Sar to output the signal to the modulation unit 10. Specifically, encryption processing based on SDMI (Secure Digital Music Ininitiative) standard or the like.

Then, the modulation unit 10, based on the encryption record signal Sar, drives a semiconductor laser (not shown) for emitting recording light beam B to the DVD-R 1 provided in the pickup 2, and generates an intensity control signal Sd for causing the pickup 2 to irradiate the light beam B whose intensity is changed according to record information contained in the encoded record signal Sar, and outputs the generated signal to the pickup 2.

Then, the pickup 2 drives the above semiconductor laser (not shown) based on the intensity control signal Sd, irradiates the recording light beam B, and records the above image information and audio information into the DVD-R 1.

At this time, the CPU 9 integrally controls each component while exchanging required control information via the bus 15. In addition, the information required for integral control is temporarily stored in the memory 8 via the bus 15 and is employed for the integral control while the information.

Each item of information contained in record information Sinn is recorded on the DVD-R 1 by way of a series of the above operations.

Now, an operation of reproducing record information that has been already recorded in the DVD-R in the recorder R will be described.

In the reproduction, the pickup 2 irradiates the light beam B for reproduction with a predetermined intensity, receives the reflection light at a light receiving unit (not shown), generates a detection signal that changes according to a change in intensity of the reflection light, and outputs the generated light to the amplifier 3.

Next, the amplifier 3 applies the predetermined amplification processing and wave trimming processing or the like to the detection signal, generates a reproduction signal Sp to output the generated signal to the demodulation unit 4.

Then, the demodulating unit 4 applies the predetermined demodulation processing to the reproduction signal Sp, generates a demodulation signal Sdm, and outputs the generated signal to the decryption unit 5.

Next, the decryption unit 5 decrypts encrypted audio information and image information contained in the demodulation signal Sdm, generates a decryption signal Sdc to output the generated signal to the audio decoder 6 and the image decoder 7.

The audio decoder 6 decodes audio information contained in the decryption Sdc, and generates decoded audio information.

In addition, the image decoder 7 decodes image information contained in the decryption signal Sdc, and generates decoded image information.

Then, the decode audio information and decode video information are outputted integrally to a television device (not shown) or the like as a decode output signal Sout.

At this time, the CPU 9 integrally control each component while exchanging required control information via the bus 15. In addition, the information required for integral control is temporarily stored in the memory 8 via the bus 15 and is employed for the integral control while the information.

Record information recorded in the DVD-R 1 is reproduced, and is externally outputted by a series of the above operations.

(ii) Operations According to the Set Top Box and the Recorder R According to the Present Invention Now, an operation of the set top box and the recorder R according to the present invention will be described.

In the case where record information Sin received in the set top box BX is transmitted to the recorder R, and further, is recorded in the DVD-R 1, when the record information Sin is inputted to the set top box B, the decode signal Sds is generated and outputted to an extracting unit 27 by means of an operation of the above described front end unit 20 and descrambler 21.

The extracting unit 27 extracts only record information to be recorded into the DVD-R 1 from the decryption signal Sds, and outputs an extraction signal Sdv to the converting circuit 28.

Then, the converting circuit 28 converts a format of the extraction signal Sdv into a record format for recording a signal into the DVD-R 1, generates a conversion signal Smv, and outputs the generated signal to the encryption unit 29.

Next, the encryption unit 29 reads out predetermined encryption processing information EC stored in the CPU 25, encrypts a conversion signal Smv by means of the predetermined encryption processing employing a predetermined encryption key and encryption table contained therein, generates an encryption signal Sx, and outputs the generated signal to the interface unit 30.

In FIG. 4, a flow of the encryption processing information EC is indicated by dotted line.

In parallel to this, the encryption unit 29 outputs the above encryption processing information EC employed for encrypting the conversion signal Smv intact to the interface unit 30.

Then, the controller 30A in the interface unit 30 outputs an encryption signal Sx to the link layer forming unit 30C as it is, while exchanging required information with the memory 32 as a memory signal Sm, and outputs the encryption processing information EC to the DTCP encryption unit 30B as it is.

The DTCP encryption unit 30B encrypts encryption processing information EC itself by way of an encrypting method that conforms to the above DTCP standard, generates an encryption processing information Sae, and outputs the generated information to a link layer forming unit 30C.

Then, the link layer forming unit 30C forms a link layer as an isochronous cycle IC by employing data contained in the encryption signal Sx and encryption processing information Sae in conformity with the serial bus standard, generates a link signal Slk, and outputs the generated signal to the physical layer forming unit 24.

At this time, in the formed isochronous cycle IC, the link layer is formed so that the encryption signal Sx is transmitted while being stored in a data packet DP within the asynchronous transmission area ACT. The link layer is formed so that encryption processing information Sae is transmitted while being stored in any isochronous packet IP within the isochronous transmission ICT.

The physical layer forming unit 24 forms a physical layer as an isochronous cycle IC by employing data contained in the link signal Slk in conformity with the serial bus standard, finally generates the isochronous cycle IC, and outputs the generated cycle to the recorder R via the serial bus B.

At this time, although the encryption signal Sx transmitted while being stored in the data packet DP is transmitted at the maximum transmission speed (for example, 400 Mbps) in the serial bus standard, transmission with an isochronous packet IP must conform with the above DTCP standard. Thus, the encryption processing information Sae transmitted while being stored in an isochronous packet IP is transmitted via a transmission speed similar to a reproduction speed during reproduction after recorded into the DVD-R 1.

In parallel to these operations, the CPU 25 controls each component containing the interface unit 30 while exchanging required control information via the bus 31.

Next, in the recorder R that has received the isochronous cycle IC from the serial bus B, a physical layer detecting unit 14D in an interface unit 14 detects each physical layer in the received isochronous cycle IC, restores the isochronous cycle IC as a link layer, generates a link signal Slk, and outputs the generated signal to the detecting unit 14C.

Then, the link layer detecting unit 14C separately extracts the above isochronous packet IP and data packet DP from the link signal Slk, outputs the above encryption signal Sx stored in the data packet DP to the controller 14A, and outputs encryption processing information Sae stored in the above isochronous packet IP to the DTCP decryption unit 14B.

The DTCP decryption unit 14B applies decryption processing that conforms to the DTCP standard corresponding to encryption processing in the above DTCP encryption unit 30B to the encryption processing information Sae, restores the above encryption processing information EC, and output the restored information to the controller 14A.

In addition, the controller 14A outputs the encryption signal Sx and encryption processing information EC as it is, to the second decryption unit 17 while exchanging required information with the memory 16 as a memory signal Sm.

The second decryption unit 17 applies the decryption processing corresponding to encryption processing in the encryption unit 29 to the encryption signal Sx by employing the encryption processing information EC, restores the above original conversion signal Smv, and outputs the restored signal to the encryption unit 11.

Thereafter, in the above encryption unit 11 and modulation 10, encryption processing to record information contained in a conversion signal Smv (encryption processing based on identification information for individually identifying the DVD-R 1 recorded in the DVD-R 1) and modulation processing (generation processing of an intensity control signal Sd that is the same as a case of the above general operation) are applied. Then, the record information transmitted from the set top box BX by means of the pickup 2 is recorded in the DVD-R 1.

At this time, the CPU 9 integrally control the above record operation while exchanging required control information via the bus 15.

By means of a series of these operations, each item of information contained in record information Sin received in the set top ox B is recorded on the DVD-R 1.

As has been described above, in an operation of the set top box BX and recorder R in accordance with the embodiment, an encryption signal Sx encrypting record information to be transmitted to the recorder R is transmitted at a high speed by employing a data packet DP. In addition, encryption processing information Sae encrypting the encryption processing information EC (encryption key and encryption table) employed for the encrypting is transmitted by employing an isochronous packet IP. Thus, the record information can be sent at a high speed and in large amount while encrypting the information.

In addition, record information is encrypted prior to transmission, and thus, the record information can be transmitted to the recorder R while the security of the record information is improved.

(III) Modified Embodiment

Now, a modified embodiment according to the present invention will be described.

In the above described embodiment, although a case in which the encryption processing information EC is provided in advance in the CPU 25 of the set top box BX has been described, the present invention is applicable to a case where information is exchanged in the following mode.

That is, first, the above identification information for individually identifying the above DVD-R 1 from other DVD-Rs is detected from the DVD-R 1 in the recorder R, and the information is transmitted to the set top box BX by employing an isochronous packet IP (after encrypted in the recorder R as required).

Next, in the set top box BX, the identification information (after decrypted in the case where the information is encrypted) is employed as encryption processing information EC (encryption key), the above conversion signal Smv is encrypted to generate the above encryption signal Sx. Then, the generated signal is transmitted (returned) to the recorder R at a high speed by employing a data packet D, and then, the transmitted signal is recorded in the DVD-R 1 in the recorder R.

In the case of such modified embodiment as well, identification information employed for encryption of record information to be transmitted to the recorder R is transmitted to the set top box BX by employing the isochrnous packet IP. In addition, the encryption signal Sx encrypted by employing the packet is returned to the recorder R at a high speed by employing a data packet DP. Thus, the record information can be sent at a high speed and in large amount while the record information is encrypted.

At this time, in the above described modified embodiment, in encryption using identification information in the set top box BX, if the encryption method is defined as a method similar to an encryption processing method employed in the e encrypting unit 11 when information is recorded in the DVD-R 1, it is sufficient if the returned encryption signal Sx is directly recorded as it is, in the DVD-R 1 in the record R. Thus, record information can be recorded in the DVD-R 1 by transmitting it to the recorder R simply and at a high speed.

In the above described embodiment and modified embodiment, although a case of recording record information in the DVD-R 1 in the recorder R has been described, another optical disk such as a DVD-RW (DVD—Re-recordable) or a DVD-RAM (DVD—Random Access Memory) or a solid memory such as semiconductor memory can be employed as a recording medium in the recorder R.

In addition, a control program for integrally controlling a series of above described record processing functions in each of CPU 9 and CPU 25 is recorded in a flexible disk or hard disk as an information recording medium, and this program is read out and executed by means of a microprocessor or the like such as a computer, thereby making it possible to function a general personal computer, server or the like as the above CPU 9 or CPU 25.

Further, the above described set top box BX can be configured so as to be transmitted to a player having only a function for reproducing record information via the serial bus B, and so as to record and output record information transmitted in the player.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-267612 filed on Sep. 4, 2000 including the specification, claims, drawings and summary is incorporated herein by reference in its entirety.

What is claimed is:

1. An information sending apparatus for sending information to an information receiving apparatus via a transmitting device capable of transmitting said information in accordance with a first transmission mode for transmitting information so as to be synchronous to other information or a second transmission mode for transmitting information so as to be asynchronous to other information, said second transmission mode for transmitting said information at a higher speed than that of transmission in accordance with said first transmission mode, said information sending apparatus comprising:

a first encrypting device for employing encryption processing information for encrypting said information, thereby encrypting specific information to be sent to said information receiving apparatus;

a first sending device for sending said encrypted specific information to said information receiving apparatus via said transmitting device in accordance with said second transmission mode;

a second encrypting device for encrypting said encryption processing information itself; and a second sending device for sending said encrypted encryption processing information to said information receiving apparatus via said transmitting device in accordance with said first transmission mode.

2. An information sending apparatus according to claim 1, wherein the information sending apparatus further comprises:

an identification information receiving device for receiving an identification information of an information recording medium sent by the information receiving apparatus; and a generating device for generating the encryption processing information on the basis of the received identification information.

3. The information sending apparatus according to claim 1, wherein said specific information is AV (Audio/Visual) information, and said encryption processing information is an encryption key and an encryption table for encrypting the AV information.

4. The information sending apparatus according to claim 1, wherein said transmitting device transmits said encrypted specific information and said encrypted encryption processing information in conformity to IEEE (Institute of Electrical and Electronic Engineers) 1394 Standard, and said first transmission mode is an isochronous transmission mode in the IEEE 1394 Standard and said second transmission mode is an asynchronous transmission mode in the IEEE 1394 Standard.

5. An information sending method of sending information to an information receiving apparatus via a transmitting device capable of transmitting said information in accordance with a first transmission mode for transmitting information so as to be synchronous to other information or a second transmission mode for transmitting information so as to be asynchronous to other information, said second transmission mode for transmitting said information at a higher speed than that of transmission in accordance with said first transmission mode, said information sending method comprising the processes of:

employing encryption processing information for encrypting said information, thereby encrypting specific information to be sent to said information receiving apparatus;

sending said encrypted specific information to said information receiving apparatus via said transmitting device in accordance with said second transmission mode;

encrypting said encryption processing information itself; and sending said encrypted encryption processing information to said information receiving apparatus via said transmitting device in accordance with said first transmission mode.

6. An information sending method according to claim 5, wherein the information sending method further comprises:

an identification information processing for receiving an identification information of an information recording medium sent by the information receiving apparatus; and a generating process for generating the encryption processing information on the basis of the received identification information.

7. An information receiving apparatus for receiving said encrypted specific information sent from said information sending apparatus according to claim 1, said information receiving apparatus comprising:

a first acquisition device for acquiring said encrypted specific information from said transmitting device;

a second acquisition device for acquiring said encrypted encryption processing information from said transmitting device;

a first decrypting device for decrypting said encrypted encryption processing information; and a second decrypting device for decrypting said encrypted specific information employing said decrypted encryption processing information.

8. An information receiving apparatus according to claim 7, wherein the information receiving apparatus further comprises:

a detecting device for detecting an identification information of an information recording medium; and an identification information sending device for sending the identification information.

9. The information receiving apparatus according to claim 7, further comprising a recording device for recording said decrypted specific information in a recording medium.

10. An information receiving method in the information receiving apparatus for receiving said encrypted specific information sent from said information sending apparatus according to claim 1, said information receiving method comprising the processes of:

acquiring said encrypted specific information from said transmitting device;

acquiring said encrypted encryption processing information from said transmitting device;

decrypting said encrypted encryption processing information; and decrypting said encrypted specific information employing said decrypted encryption processing information.

11. An information receiving method according to claim 10, wherein the information receiving method further comprises:

a detecting process for detecting an identification information of an information recording medium; and an identification information sending process for sending the identification information.

* * * * *